(12) United States Patent
Jain et al.

(10) Patent No.: US 10,614,815 B2
(45) Date of Patent: Apr. 7, 2020

(54) CONVERSATIONAL CHALLENGE-RESPONSE SYSTEM FOR ENHANCED SECURITY IN VOICE ONLY DEVICES

(71) Applicant: International Business Machines Corporation, Armonk, NY (US)

(72) Inventors: Mohit Jain, Dhanbad (IN); Pratyush Kumar, Chennai (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/832,162

(22) Filed: Dec. 5, 2017

(65) Prior Publication Data
US 2019/0172468 A1 Jun. 6, 2019

(51) Int. Cl.
| G10L 15/00 | (2013.01) |
| G10L 17/24 | (2013.01) |
| G10L 15/22 | (2006.01) |
| G06F 3/16 | (2006.01) |
| G06F 21/32 | (2013.01) |

(52) U.S. Cl.
CPC .............. G10L 17/24 (2013.01); G06F 3/167 (2013.01); G06F 21/32 (2013.01); G10L 15/22 (2013.01); *G10L 2015/223* (2013.01)

(58) Field of Classification Search
USPC .................................. 704/231–257, 270–275
See application file for complete search history.

(56) References Cited

U.S. PATENT DOCUMENTS

| 7,054,819 | B1 | 5/2006 | Loveland |
| 7,552,467 | B2 | 6/2009 | Lindsay |
| 9,245,139 | B2 | 1/2016 | Thorpe |
| 2004/0193420 | A1* | 9/2004 | Kennewick ......... G06F 16/3329 704/257 |
| 2009/0055193 | A1 | 2/2009 | Maislos et al. |

(Continued)

OTHER PUBLICATIONS

Soupionis, Yannis et al., "Audio Captcha: Existing solutions assessment and a new implementation for VoIP telephony", Computers & Security, ScienceDirect, 2010, 16 pages, Elsevier.
(Continued)

*Primary Examiner* — Jesse S Pullias
(74) *Attorney, Agent, or Firm* — Ference & Associates LLC

(57) ABSTRACT

One embodiment provides a method, including: receiving user voice input comprising a user command to perform an action; determining whether the user command comprises a high risk command or a low risk command; providing a first audible query and a second audible query, wherein the first audible query and the second audible query are related to a verification request for verifying that the user voice input is provided by a user and wherein an answer corresponding to one of the first audible query and the second audible query is stored in a system; receiving a first voice answer input responsive to the first audible query and a second voice answer input responsive to the second audible query; and performing, responsive to determining that at least one of the first voice answer input and the second voice answer input matches the answer stored in the system, the action.

19 Claims, 3 Drawing Sheets

(56) References Cited

U.S. PATENT DOCUMENTS

| | | | |
|---|---|---|---|
| 2009/0319270 A1* | 12/2009 | Gross | G10L 15/22 |
| | | | 704/246 |
| 2010/0049526 A1* | 2/2010 | Lewis | G10L 15/22 |
| | | | 704/273 |
| 2014/0163986 A1* | 6/2014 | Lee | G10L 15/00 |
| | | | 704/248 |
| 2014/0259138 A1* | 9/2014 | Fu | H04L 63/083 |
| | | | 726/7 |
| 2014/0307876 A1 | 10/2014 | Agiomyrgiannakis et al. | |
| 2014/0330568 A1 | 11/2014 | Lewis et al. | |
| 2015/0310198 A1 | 10/2015 | Gross | |
| 2017/0068805 A1 | 3/2017 | Chandrasekharan et al. | |

OTHER PUBLICATIONS

Gao, Haichang et al., "An audio Captcha to distinguish humans from computers", Third International Symposium on Electronic Commerce and Security, 2010, 5 pages, IEEE Computer Society.

Shirali-Shahreza, Sajad et al., "Verifying Human Users in Speech-Based Interactions", Interspeech, Aug. 28-31, 2011, Florence, Italy, 4 pages, ISCA.

Shirali-Shahreza, Sajad et al., "SeeSay and HearSay Captchas for Mobile Interaction", CHI 2013, Changing Perspectives, Session: Mobile Interaction, Apr. 27-May 2, 2013, Paris, France, 10 pages, ACM Digital Library.

* cited by examiner

CONVERSATIONAL CHALLENGE-RESPONSE SYSTEM FOR ENHANCED SECURITY IN VOICE ONLY DEVICES

BACKGROUND

Users frequently utilize information handling devices ("devices"), for example laptop and personal computers, tablet devices, smart phones, smart speakers, and the like, to access various types of information and/or to complete various user-commanded tasks. For example, users may use devices to browse websites, conduct transactions, create and/or make changes to existing files, and the like. Certain content and tasks, however, cannot be accessed or performed unless a user can show that they are, in fact, human, rather than a robot. Such a showing can be performed, for example, by the completion of a challenge-response cycle in which the challenge output is of such a nature that only a human-based user can provide the correct verification response. The implementation of such a human-user verification system may distinguish human input from machine input and may aid in thwarting spam and automated extraction of data (e.g., from websites, from files, etc.).

BRIEF SUMMARY

In summary, one aspect of the invention provides a method, comprising: utilizing at least one processor to execute computer code that performs the steps of: receiving, at a voice-enabled information handling device, voice input from a user, the voice input comprising a user command for the information handling device to perform an action; determining whether the user command corresponds to a high risk command or a low risk command; providing, responsive to determining that the user input corresponds to a high risk command, a first audible query and a second audible query, one of the queries corresponding to a verification request and the other of the queries corresponding to training a verification system for verification of at least one user; receiving a first voice answer input responsive to the first audible query and a second voice answer input responsive to the second audible query; and performing, responsive to determining that at least one of the first voice answer input and the second voice answer input matches an answer that (i) is stored in the verification system and (ii) corresponds to the verification request, the action of the user command.

Another aspect of the invention provides an apparatus, comprising: at least one processor; and a computer readable storage medium having computer readable program code embodied therewith and executable by the at least one processor, the computer readable program code comprising: computer readable program code that receives at, a voice-enabled information handling device, voice input from a user, the voice input comprising a user command for the information handling device to perform an action; computer readable program code that determines whether the user command corresponds to a high risk command or a low risk command; computer readable program code that provides, responsive to determining that the user input corresponds to a high risk command, a first audible query and a second audible query, one of the queries corresponding to a verification request and the other of the queries corresponding to training a verification system for verification of at least one user; computer readable program code that receives a first voice answer input responsive to the first audible query and a second voice answer input responsive to the second audible query; and computer readable program code that performs, responsive to determining that at least one of the first voice answer input and the second voice answer input matches an answer that (i) is stored in the verification system and (ii) corresponds to the verification request, the action of the user command.

An additional aspect of the invention provides a computer program product, comprising: a computer readable storage medium having computer readable program code embodied therewith and executable by the at least one processor, the computer readable program code comprising: computer readable program code that receives at, a voice-enabled information handling device, voice input from a user, the voice input comprising a user command for the information handling device to perform an action; computer readable program code that determines whether the user command corresponds to a high risk command or a low risk command; computer readable program code that provides, responsive to determining that the user input corresponds to a high risk command, a first audible query and a second audible query, one of the queries corresponding to a verification request and the other of the queries corresponding to training a verification system for verification of at least one user; computer readable program code that receives a first voice answer input responsive to the first audible query and a second voice answer input responsive to the second audible query; and computer readable program code that performs, responsive to determining that at least one of the first voice answer input and the second voice answer input matches an answer that (i) is stored in the verification system and (ii) corresponds to the verification request, the action of the user command.

A further aspect of the invention provides a method, comprising: utilizing at least one processor to execute computer code that performs the steps of: receiving user command input initiating a multi-turn interactive challenge session with a digital assistant, wherein the multi-turn interactive challenge session comprises provision of at least one audible output query and receipt of at least one audible answer input corresponding to the at least one audible output query; and performing an action corresponding to the user command input responsive to determining that the at least one audible answer input matches an answer corresponding to the at least on audible output query.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
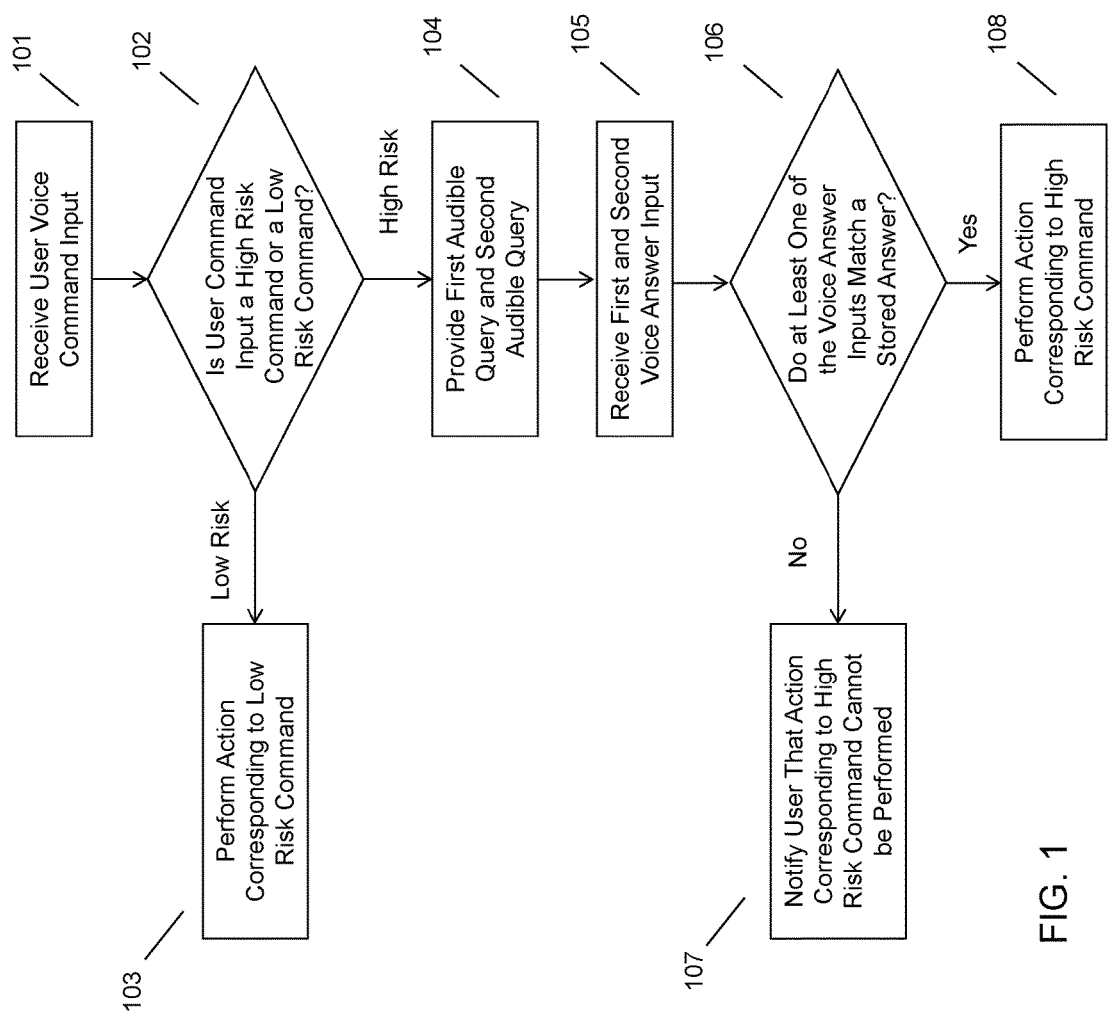
FIG. 1 illustrates an example method of identifying and performing an action associated with a high risk command using a conversational challenge-response system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-3. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 3. In accordance with an example embodiment, all of the process steps, components and outputs discussed with respect to FIGS. 1-2 can be performed or utilized by way of a processing unit or units and system memory such as those indicated, respectively, at 16' and 28' in FIG. 3, whether on a server computer, a client computer, a node computer in a distributed network, or any combination thereof.

An example of a widely used challenge-response verification program is the Completely Automated Public Turing test to tell Computers and Humans Apart ("CAPTCHA") system. In this system, a user is required to identify text in images prior to gaining access to requested content. For example, an image comprising two words may be presented to a user. The two words in the image may have been manipulated in order to obscure and/or prevent computer interpretation of the words (e.g., the letters in the words may be twisted, the words may be provided in a stylistic font, the background color of the words may comprise a slight color gradient, etc.). A user may then be asked to identify the manipulated words in the image (e.g., by typing the identified words into an input field, etc.). Usually, one of the two words has a text transcription known to the system, while the other one is unknown. The goal of the CAPTCHA system is to check that a human gets the "known" question right. The "unknown" question may be used to enhance some background task (e.g., book digitization, road sign transcription, etc.).

Although the CAPTCHA challenge-response system has been very effective in differentiating human input from machine input on devices comprising display screens (e.g., personal and laptop computers, smart phones, tablets, etc.), this system does little to help differentiate human from machine input on voice-only devices lacking a display screen (e.g., Amazon Echo®, Google Home®, etc.). Like traditional devices comprising display screens, these voice-only devices allow privileged access to services such as purchasing music/applications/ebooks, sending emails, updating and/or changing account-based information, and the like. While some of these voice-only devices may require a voice confirmation prior to accessing information and/or completing a task, this type of audible security method may still leave a voice-only device vulnerable to malicious attack. For example, in order to by-pass the aforementioned audible security system, a phone application can record a user's voice and then replay it for the voice-only device. Even if the voice-only device uses voice recognition, the malicious application can be programmed to impersonate the voice of the user.

Accordingly, the techniques and systems as described herein provide a method of enhancing the security of voice-only devices by utilizing a conversational challenge-response system. The system may receive audible command input from a user and determine whether the audible command input corresponds to a high risk command (e.g., a financial transaction, a request to access a privileged account, a request to change a particular setting, etc.) or a low risk command (e.g., querying the current time, querying about current weather conditions, etc.). Responsive to determining that the user input corresponds to a high risk command, the system may provide at least two audible queries that require corresponding user voice answer input. For example, the audible queries may ask the user to recite a statement in a particular tone, to identify the tone of a provided statement, to identify the ethnicity of a user providing a particular statement, and the like. The system may thereafter perform an action associated with the user command if it is determined that at least one of the user voice answer inputs correspond to an answer associated with one of the audible queries. Such a method may appropriately distinguish between human input and machine input provided to a voice-only device lacking a display.

One of the audible queries may relate to a Must Answer Question (MAQ) and the other audible query may relate to a Good-to Answer Question (GTAQ). The MAQ may have a corresponding answer that is known to the system while the answers to the GTAQ may not be known to the system. The system, upon receiving correct answers from users to MAQs, may ask the user a GTAQ and thereafter aggregate the answers to the GTAQ from several users to perform one or more additional functions that may serve a useful purpose (e.g., identify which GTAQs may be used as future MAQs, book digitization, etc.). Alternatively, the system may ask the GTAQ first and, irrespective of the correctness of the provided answer to the GTAQ, thereafter ask an MAQ for verification. If the answer to the MAQ is correct, the system may then store the answer that was provided to the GTAQ for later use.

Referring now to FIG. 1, the system may perform an action associated with an audibly provided high risk command responsive to receiving correct user input to query outputs provided during a conversational challenge-response verification session. At 101, the system may receive user voice input comprising a command to perform an action. The user input may be audible, voice input and may be received at an input device (e.g., a microphone, a speech capture device, etc.) operatively coupled to the device. The device may be a voice-only information handling device without a display (e.g., Amazon Echo®, Google Home®, etc.). The information handling device may include digital assistant software that users may audibly interact with and which may perform user-commanded tasks, as well as provide audible outputs responsive to corresponding user inputs.

The input device may be an input device integral to the information handling device. For example, a smart speaker may be disposed with a microphone capable of receiving voice input data. Alternatively, the input device may be disposed on another device and may transmit received voice input data to the information handling device. For example, voice input may be received at a smart speaker that may subsequently transmit the voice data to another device (e.g., to a user's smartphone for processing, etc.). Voice input data may be communicated from other sources to the information handling device via a wireless connection (e.g., using a BLUETOOTH® connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like.

The input device may be configured to continuously receive voice input data by maintaining the input device in an active state. The input device may, for example, continuously detect voice input data even when other sensors (e.g., light sensors, speakers, other microphones, etc.) associated with the information handling device are inactive. Alternatively, the input device may remain in an active state for a predetermined amount of time (e.g., 30 minutes, 1 hour, 2 hours, etc.). Subsequent to not receiving any voice input data during this predetermined time window, the system may switch the input device to a power off state. The predetermined time window may be preconfigured by a manufacturer or, alternatively, may be configured and set by one or more users.

At 102, the system may determine whether the user command comprises a high risk command or a low risk command. A high risk command may be any command whose outcome may have a significant impact on the user and/or the user's interests. For example, a high risk command may be associated with a financial transaction (e.g., purchase of an item such as a song or book, transfer of cash to another individual, etc.), a request to access a privileged account (e.g., a request to access a user's email, etc.), a request to change a particular setting (e.g., a request to change a user's password, etc.), and the like. A low risk command may be any command having an outcome that does not have a significant impact on the user and/or the user's interests. For example, a low risk command may be associated with a request for the current time, a request for the current temperature, and the like. Criteria that dictate what constitutes a high or low risk command may be programmed by the manufacturer and/or may be designated by the user.

The determination may comprise comparing the user command to a list of high-risk commands stored in an accessible storage database or location (e.g., local data storage location, remote storage location, cloud storage location, etc.) and determining whether the user command matches at least one of the high-risk commands in the list. The comparison may be done, for example, using one or more conventional speech analysis techniques that are capable of parsing and/or transcribing words in audible speech and comparing those words to the words utilized in the high-risk commands in the list. The list of high-risk commands may be pre-programmed by the manufacturer and/or may be designated and updated by the user.

Responsive to identifying that the user command is associated with a low risk command, the system may perform, at 103, an action corresponding to the low risk command (e.g., recite the time, recite the current weather conditions, etc.). Responsive to identifying that the user command is associated with a high risk command, the system may provide, at 104, a first audible query and a second audible query. It is important to note that although the terms "first and second" are used throughout this application to refer to the number of audible queries provided, this is non-limiting and additional queries may be provided (e.g., a third audible query, a fourth audible query, etc.).

The first and second audible queries may be related to a verification request for verifying that the user voice input is provided by a human user rather than a machine. To achieve this goal, the first and second audible queries may request a user to provide a particular type of input(s) responsive to the audible query. The system, after provision of the audible queries, may receive, at 105, a first and second voice answer input corresponding to the first and second audible queries (i.e., the first voice answer input corresponds to the first audible query, the second voice answer input corresponds to the second audible query, etc.). All of the audible queries may be provided prior to provision, by the user, of any voice answer inputs. Alternatively, a user may provide a voice answer input immediately after a corresponding audible query (e.g., a user may provide a first voice answer input after provision of a first audible query, etc.).

Non-limiting examples of various types of audible queries will now be provided. It is important to note that although the terms first and second audible "query" are used throughout this application, these terms are non-limiting and are not restricted to only questions, but rather, can also relate to requests asked of the user by the system, as further described below. As one example, an audible query may ask a user to recite a particular passage in a specific tone. For example, an audible query may posit "Say 'I am feeling lucky' with enthusiasm" or "Say 'Don't you dare come near me!' in an aggressive tone".

As another example, a system may first recite a statement to the user and thereafter ask, using the audible queries, questions about that statement. For example, a statement may be recited to a user in different tones (e.g., one portion of the statement may be recited in an angry tone and another portion of the statement may be recited in a happy tone, etc.). The first and second audible queries may then ask the user to recite the portion of the statement provided in the requested tone. For example, the first audible query may ask the user to recite the portion of the statement provided in the angry tone, whereas the second audible query may ask the user to recite the portion of the statement provided in the happy tone.

As another example, a system may ask a user to identify a difference in accents. For example, a portion of a provided statement may be made in an Australian accent, whereas another portion of a provided statement may be made in a Russian accent. The audible queries may then ask the user to recite the portion of the provided statement provided in the requested accent (e.g., recite the portion of the statement provided in the Australian accent, etc.). As another example, the system may ask a user to identify a numerical occurrence of audible events. For example, a system may first provide the user with a series of sounds associated with different noises (e.g., 5 horn sounds, followed by 2 quack sounds, followed by 4 bell sounds, etc.). The system may then ask the user to identify the numerical occurrence of a particular sound. For example, a system may query the user to recite how many "quack" sounds were present in the series. Alternatively, in another example, the system may query the user to identify a sequential occurrence of sounds. For example, a system may query the user to recite which series of sounds occurred after the quack sounds (i.e., the bell sounds).

A combination of the aforementioned types of audible queries may be used for an audible query set (i.e., where a set comprises a first and second audible query). For example, the first audible query may ask the user to recite a passage in a specific tone whereas the second audible query may ask the user to identify the portion of a statement provided in a specific tone. Stated differently, the first and second audible queries do not have to be related. Other audible queries are possible and contemplated.

Responsive to receiving, at 105, voice answer inputs, the system may determine, at 106, whether at least one of the voice answer inputs match a stored answer. A "correct answer" corresponding to at least one of the audible queries may be stored at an accessible storage location. The answer may be pre-set by a manufacturer or may be provided by a user. For example, an answer to the audible query "Say 'I am feeling lucky' with enthusiasm" may be a stored recitation of the phrase "I am feeling lucky" provided in an enthusiastic tone. As another example, an answer to the audible query "Which type of sound occurred after the quack sound?" in reference to an audible series of sounds in which a horn sound occurred after the quack sound may be "horn" or one of a list of stored synonyms for "horn" such as "siren" or "blast". The determination may be conducted, for example, using one or more conventional speech analysis techniques that are capable of parsing and/or transcribing words in audible speech and comparing those words to the words and/or sounds present in the answer.

The determination may also be done using an automatic dialog feature analyzer (ADFA). The ADFA may be initially trained by providing, to the ADFA, a multitude of predetermined questions and/or commands with corresponding answers. For example, the command "Speak 'when can I go?' politely" may be provided to the ADFA along with the corresponding audible statement 'when can I go?' provided in a polite manner. In this way, the ADFA may recognize characteristics of what a polite tone is and thereafter use those recognized characteristics to identify whether subsequent user-provided polite tonal input matches those characteristics. For example, if the ADFA subsequently receives a tonal input responsive to a system-provided command statement to provide polite tonal input, the ADFA may assign a confidence score to the input (e.g., where the confidence score corresponds to the presence of characteristics in the subsequently provided input matching the known characteristics of polite input, etc.) and identify whether that confidence score exceeds a predetermined confidence threshold. Responsive to identifying that the confidence score does exceed the confidence threshold, the ADFA may recognize that input as polite input. Based upon the receipt of user provided inputs, the ADFA may be dynamically updated and refined. For example, the ADFA may learn to recognize characteristics of a specific tone (e.g., a happy tone, a sad tone, etc.) provided in different accents (e.g., American English, British English, Australian English, etc.). In such a case, the ADFA may be able to better recognize that tone regardless of the accent the tone is provided in.

Responsive to determining, at 106, that neither of the voice answer inputs matches the answer, the system may notify, at 107, a user that an action corresponding to the high risk command cannot be performed. The notification may be, for example, an audible notification provided by the device stating that the high risk command could not be completed and/or that the voice answer input did not match a stored answer. The notification may comprise a query asking the user if they would like to try again. Responsive to receiving a positive answer, the system may revert to step 104 and provide a different first and second audible query. Responsive to determining, at 106, that at least one of the voice answer inputs matches the answer, the system may perform, at 108, an action corresponding to the high risk command (e.g., purchase the requested item, complete the requested transaction, change the requested setting, etc.).

Figure 2:
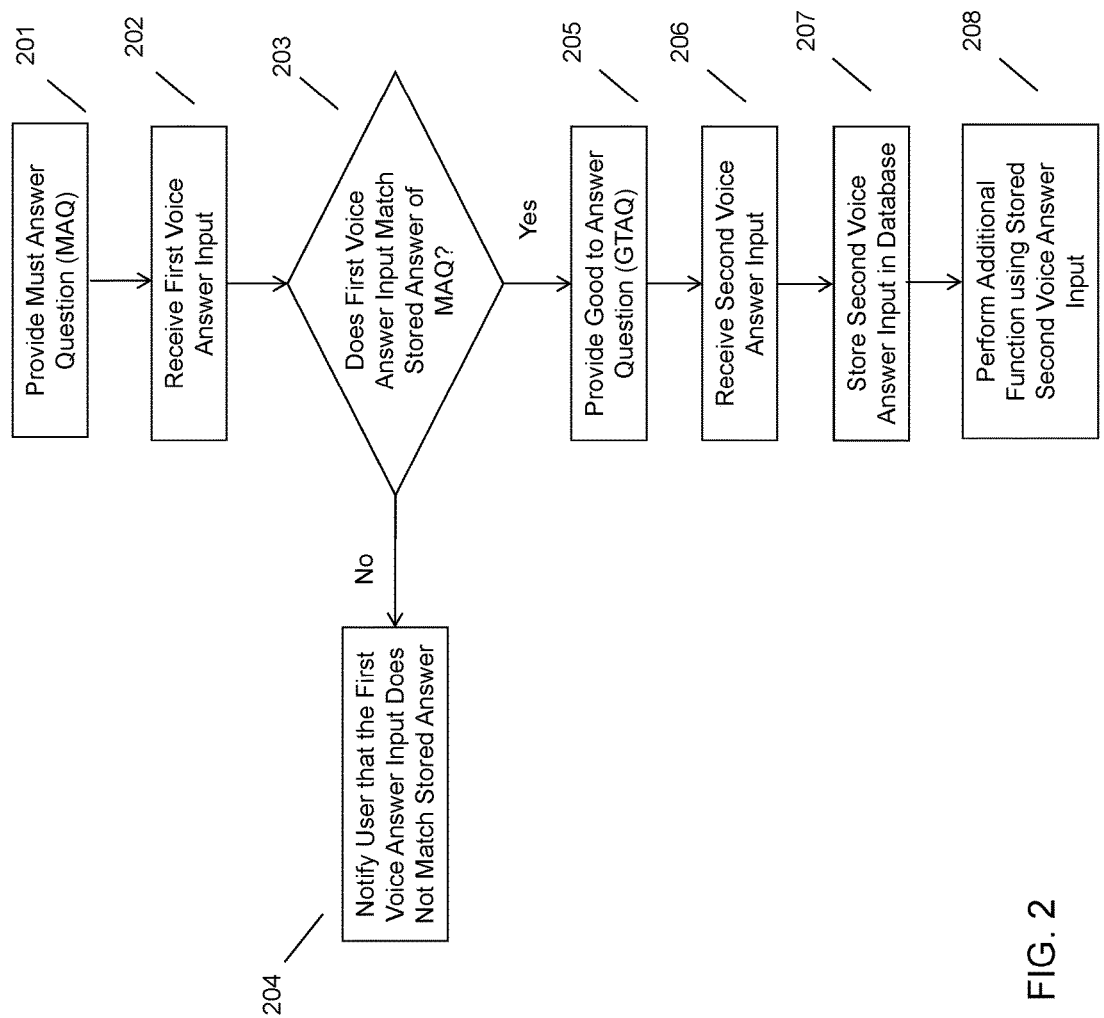
FIG. 2 illustrates an example method of utilizing MAQs and GTAQs.

Referring now to FIG. 2, one of the first audible query and the second audibly query may be associated with a Must Answer Question (MAQ) and the other audible query may be associated with a Good to Answer Question (GTAQ). The MAQ may have a corresponding answer that is known to the system while the answers to the GTAQ may not be known to the system. For example, a user providing a high-risk command must provide, responsive to receiving the MAQ, an answer input corresponding to the stored answer of the MAQ to pass step 106 of FIG. 1. However, a user's answer input responding to the GTAQ may not be compared against any stored answer and may therefore not be required to pass step 106. Upon receiving correct answers from users to MAQs, the system may ask the user a GTAQ and thereafter aggregate the answers to the GTAQ from several users to perform one or more additional functions that may serve a useful purpose (e.g., identify which GTAQs may be used as future MAQs, book digitization, etc.).

Even though FIG. 2 illustrates step 205 referencing providing a GTAQ as occurring after step 201 referencing providing an MAQ, it should be understood that this order is not necessary. Rather, the system may first provide the GTAQ, corresponding to 205, and receive a voice answer input, corresponding to 206. Then the system may provide the MAQ, corresponding to 201, and receive a voice answer input, corresponding to 202. If the answer to the MAQ matches the stored answer, corresponding to 203, the system may then store the voice answer input (206) provided in response to the GTAQ (205) as shown in 207. In other words, the system may either provide the MAQ or the GTAQ first and then if the answer to the MAQ matches a stored answer, the system will store the response to the GTAQ for later use.

In an example use-case, the system may provide, at 201, an MAQ, which is associated with one of the first and second audible queries. In this use-case, the MAQ may be associated with the first audible query and the GTAQ may be associated with the second audible query. However, this sequential configuration is not limiting and in practice the GTAQ may be provided before the MAQ (e.g., the ordering of GTAQ and MAQ may be randomly selected, etc.). The system may then receive, at 202, a first voice answer input. Responsive to determining, at 203, that the first voice answer input does not match the stored answer of the MAQ, the system may notify, at 204, a user that the first voice answer input does not match the stored answer. The notification may be, for example, an audible notification provided by the device stating that the first voice answer input did not match a stored answer.

Responsive to determining, at 203, that the first voice answer input does match the stored answer of the MAQ, the system may provide, at 205, a second audible output query associated with a GTAQ. In some situations, the system may generate the GTAQs automatically by asking a question about or modifying some type of accessible content (e.g., content available online, content available locally, etc.). For example, a GTAQ may be auto-generated by adding tones to a certain phrase (e.g., a portion of text found online) and thereafter asking the user to identify the tone. Alternatively, a GTAQ may be auto-generated by asking the user to identify a recognized selected audio clip that the system has obtained (e.g., on a social media site, from an audio clip database, from a video database, etc.). The system may then receive, at 206, a second voice answer input corresponding to the GTAQ and may then store, at 207, the second voice answer input in an accessible database (e.g., a database stored locally, remotely, in the cloud, etc.). The accessible database may contain answers to the same GTAQ that have been provided by other users (e.g., users utilizing different devices, etc.). The system may then perform, at 208, an additional function using the stored second voice answer input (e.g., adding the GTAQ to an MAQ bank, using the answer input for book digitization, etc.).

One function may correspond to adding the GTAQ into an MAQ bank (i.e., a database of stored MAQs) responsive to receiving a predetermined number of answer inputs associated with the GTAQ. For example, a GTAQ is added to an MAQ bank after 5 answers are provided for the GTAQ. The GTAQ may not be added to the MAQ bank until a predetermined number of the same, or substantially the same, answers are provided for the GTAQ. For example, prior to adding the GTAQ to an MAQ bank, the system may require that 5 answers need to be received that are the same (e.g., 5 answers provided in the same requested tone, 5 answers reciting the same portion identically, etc.).

Additionally or alternatively, based on a user's response to the GTAQs, the ADFA may be updated and extended. For example, if 10 users are asked, as part of a GTAQ, to provide a statement in a particular tone (e.g., a happy tone, etc.) and 6 users provide responsive input in a same or substantially similar manner, then the characteristics of the tonal input provided by those 6 users may be used to enrich the ADFA's understanding of a happy tone. Additionally, the GTAQs asked by the ADFA may be questions directed toward concepts that the ADFA recognizes it needs greater understanding in. For instance, the ADFA may recognize that it has a weak understanding regarding the characteristics of an excited tone (e.g., due to a lack of user input provided in an excited tone, etc.). Therefore, the ADFA may provide a GTAQ commanding the user to provide a statement in an excited tone. Based upon received user inputs provided in an excited tone, the ADFA's understanding of an excited tone may be enhanced from an analysis of the characteristics of that "excitedly" provided user input.

Figure 3:
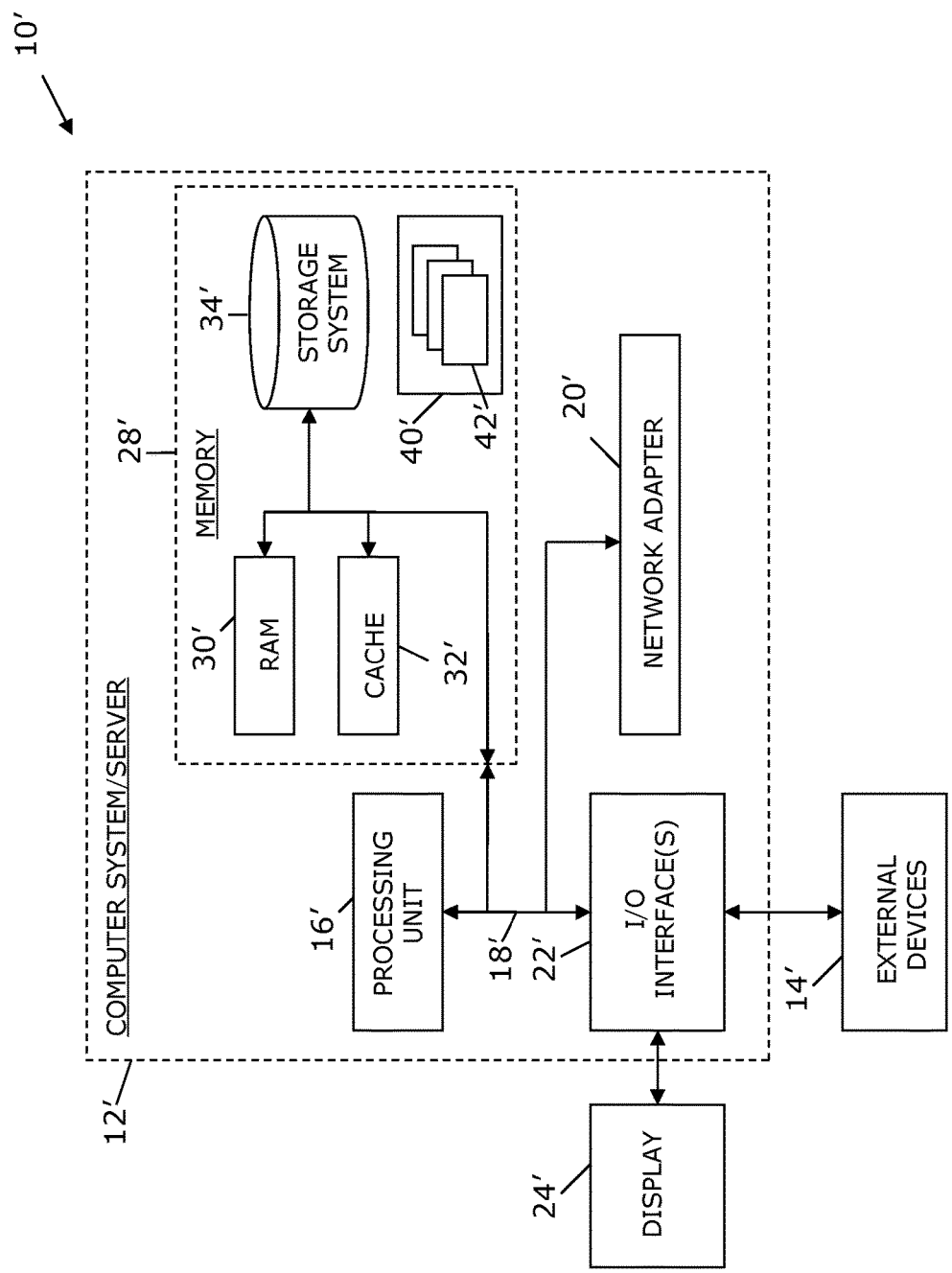
FIG. 3 illustrates a computer system.

As shown in FIG. 3, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/ server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
receiving, at a voice-enabled information handling device, voice input from a user, the voice input comprising a user command for the information handling device to perform an action;
determining whether the user command corresponds to a high risk command or a low risk command;
providing, responsive to determining that the user input corresponds to a high risk command, a first audible query and a second audible query, one of the queries corresponding to a verification request and the other of the queries corresponding to training a verification system for verification of at least one user;
receiving a first voice answer input responsive to the first audible query and a second voice answer input responsive to the second audible query; and
performing, responsive to determining that at least one of the first voice answer input and the second voice answer input matches an answer that (i) is stored in the verification system and (ii) corresponds to the verification request, the action of the user command;
wherein one of the first audible query and the second audible query is associated with a Must Answer Question (MAQ), and the other of the first audible query and the second audible query is associated with a Good To Answer Question (GTAQ).

2. The method of claim 1, wherein the information handling device is a voice-only information handling device without a display.

3. The method of claim 1, wherein the determining comprises (i) comparing the user command to a list of high-risk commands stored in a database and (ii) determining whether the user command matches at least one high-risk command in the list.

4. The method of claim 1, wherein the MAQ comprises the query corresponding to the verification request, wherein the verification request has a corresponding answer stored in the system.

5. The method of claim 4, responsive to determining that the voice answer input corresponding to the MAQ matches the answer stored in the system, storing the received answer input associated with the GTAQ in a database, wherein the database comprises answer inputs provided by other users to the GTAQ.

6. The method of claim 5, further comprising adding the GTAQ into a MAQ bank responsive to receiving a predetermined number of answer inputs associated with the GTAQ.

7. The method of claim 1, wherein the determining that the at least one of the first voice answer input and the second voice answer input matches the answer comprises using, for the determination, an automatic dialog feature analyzer (ADFA) capable of being dynamically updated responsive to the voice answer inputs.

8. The method of claim 1, wherein at least one of the first audible query and the second audible query comprise a request to recite a statement in a particular tone.

9. The method of claim 1, wherein the providing comprises providing a statement prior to provision of the first audible query and the second audible query, and wherein at least one of the first audible query and the second audible query relate to the provided statement.

10. An apparatus, comprising:
at least one processor; and
a computer readable storage medium having computer readable program code embodied therewith and executable by the at least one processor, the computer readable program code comprising:
computer readable program code that receives at, a voice-enabled information handling device, voice input from a user, the voice input comprising a user command for the information handling device to perform an action;
computer readable program code that determines whether the user command corresponds to a high risk command or a low risk command;
computer readable program code that provides, responsive to determining that the user input corresponds to a high risk command, a first audible query and a second audible query, one of the queries corresponding to a verification request and the other of the queries corresponding to training a verification system for verification of at least one user;
computer readable program code that receives a first voice answer input responsive to the first audible query and a second voice answer input responsive to the second audible query; and
computer readable program code that performs, responsive to determining that at least one of the first voice answer input and the second voice answer input matches an answer that (i) is stored in the verification system and (ii) corresponds to the verification request, the action of the user command;
wherein one of the first audible query and the second audible query is associated with a Must Answer Question (MAQ), and the other of the first audible query and the second audible query is associated with a Good To Answer Question (GTAQ).

11. A computer program product, comprising:
a computer readable storage medium having computer readable program code embodied therewith and executable by the at least one processor, the computer readable program code comprising:
computer readable program code that receives at, a voice-enabled information handling device, voice input from a user, the voice input comprising a user command for the information handling device to perform an action;
computer readable program code that determines whether the user command corresponds to a high risk command or a low risk command;
computer readable program code that provides, responsive to determining that the user input corresponds to a high risk command, a first audible query and a second audible query, one of the queries corresponding to a verification request and the other of the queries corresponding to training a verification system for verification of at least one user;

computer readable program code that receives a first voice answer input responsive to the first audible query and a second voice answer input responsive to the second audible query; and computer readable program code that performs, responsive to determining that at least one of the first voice answer input and the second voice answer input matches an answer that (i) is stored in the verification system and (ii) corresponds to the verification request, the action of the user command;

wherein one of the first audible query and the second audible query is associated with a Must Answer Question (MAQ), and the other of the first audible query and the second audible query is associated with a Good To Answer Question (GTAQ).

12. The computer program product of claim 11, wherein the information handling device is a voice-only information handling device without a display.

13. The computer program product of claim 11, wherein the determining comprises (i) comparing the user command to a list of high-risk commands stored in a database and (ii) determining whether the user command matches at least one high-risk command in the list.

14. The computer program product of claim 11, wherein one of the first audible query and the second audible query is associated with a Must Answer Question (MAQ), and the other of the first audible query and the second audible query is associated with a Good To Answer Question (GTAQ).

15. The computer program product of claim 11, wherein the MAQ comprises the query corresponding to the verification request, wherein the verification request has a corresponding answer stored in the system.

16. The computer program product of claim 15, responsive to determining that the voice answer input corresponding to the MAQ matches the answer stored in the system, storing the received answer input associated with the GTAQ in a database, wherein the database comprises answer inputs provided by other users to the GTAQ.

17. The computer program product of claim 16, further comprising adding the GTAQ into a MAQ bank responsive to receiving a predetermined number of answer inputs associated with the GTAQ.

18. The computer program product of claim 11, wherein the providing comprises providing a statement prior to provision of the first audible query and the second audible query, and wherein at least one of the first audible query and the second audible query relate to the provided statement.

19. A method, comprising:

utilizing at least one processor to execute computer code that performs the steps of:

receiving user command input initiating a multi-turn interactive challenge session with a digital assistant, wherein the multi-turn interactive challenge session comprises provision of at least one audible output query and receipt of at least one audible answer input corresponding to the at least one audible output query; and performing an action corresponding to the user command input responsive to determining that the at least one audible answer input matches an answer corresponding to the at least one audible output query;

wherein the at least one audible output query comprises a first audible query and a second audible query and wherein one of the first audible query and the second audible query is associated with a Must Answer Question (MAQ), and the other of the first audible query and the second audible query is associated with a Good To Answer Question (GTAQ).

* * * * *